J. VON WITZLEBEN.
DUMPING WAGON.

No. 246,844. Patented Sept. 6, 1881.

Witnesses:
C. Rich. Schlesinger
Huber Schlesinger
F. Knute

The inventor:
Job von Witzleben

United States Patent Office.

JOB VON WITZLEBEN, OF ARNSTADT, SCHWARZBURG, GERMANY.

DUMPING-WAGON.

SPECIFICATION forming part of Letters Patent No. 246,844, dated September 6, 1881.

Application filed October 11, 1879.

*To all whom it may concern:*

Be it known that I, JOB VON WITZLEBEN, of Arnstadt, in the Principality of Schwarzburg, Germany, have invented new and useful Improvements in Tilting-Carts, which are fully set forth in the following specification.

The present invention relates to that class of dumping carts or wagons in which the body is moved to the rear of the bed-frame and tilted thereat by means of a rack-and-pinion mechanism.

The object of the invention is to provide more simple and effective means for sliding the cart or wagon body in a rearward direction and dumping the same and holding it in an inclined position and then returning it to its normal position, so as to rest upon the bed-frame and be securely locked thereto.

To these ends the invention consists in the construction and combination of parts, which will be hereinafter more fully described, and then set forth in the claims.

Figure 1:
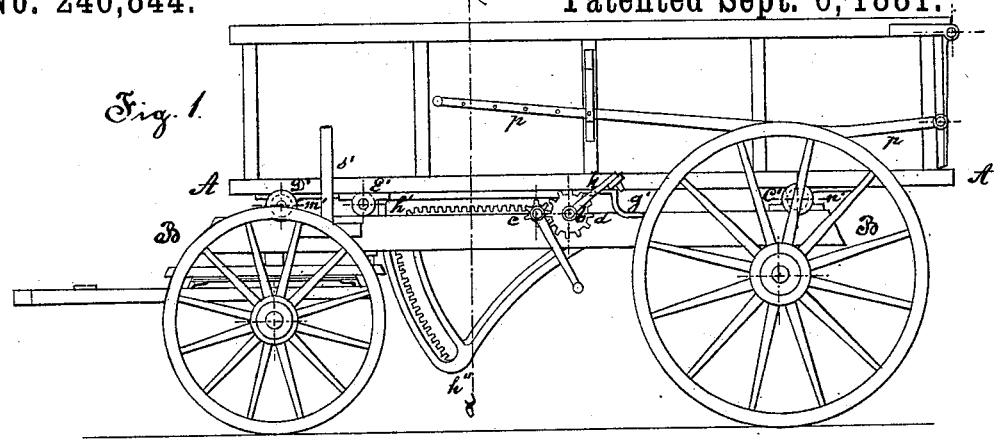
Figure 2:
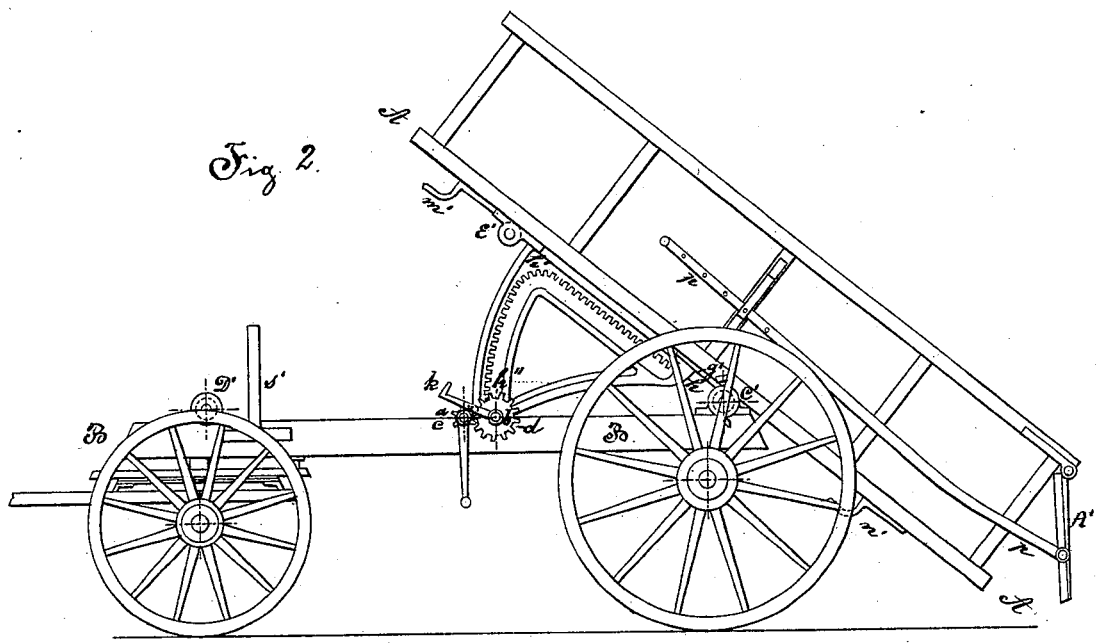
Figure 3:
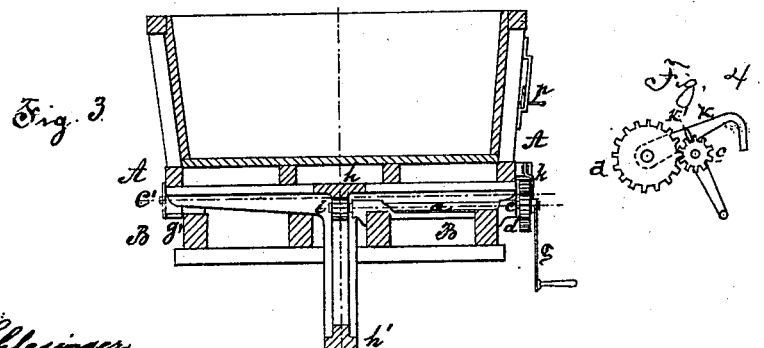
Figure 4:
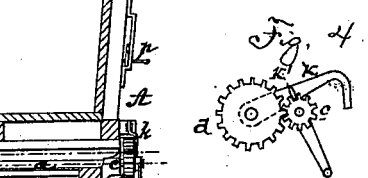

In the drawings, Figure 1 is a side elevation of a dumping wagon or cart, showing the body resting upon the bed-frame in a horizontal position. Fig. 2 is a side elevation, showing the wagon or cart body in a tilted position. Fig. 3 is a transverse section, taken through the dotted line $a\,b$, Fig. 1. Fig. 4 is a detail view, showing the lock for the rack-operating devices.

The letter A designates a wagon or cart body or box, which is provided with a hinged end-gate, A', having a longitudinal rod or lever, $p$, for the purpose of manipulating the same. The end-gate is hinged to the top of the wagon-box, and the rod for operating the same is so arranged that the driver can, while holding the reins of the draft-animals with one hand, open or close the end-gate with the other hand.

The wagon or cart box A is mounted upon the wheeled bed-frame or truck B, and is capable of being moved back and forth thereon for the purpose hereinafter stated.

A curved or angular rack secured to the under side of the wagon-box serves, in connection with spurred shafts on the truck or bed-frame, to move said box in a longitudinal direction and dump or tilt it when it reaches the proper position.

The rack consists of the rack-bar $h'$ and the smooth-faced bar $h''$, which, together with the transverse bar $h$, are all constructed of a single piece of metal. The transverse bar $h$ is securely fastened to the under side of the wagon-box, so as to bring the rack proper at or about the center of said box.

The devices for communicating motion to the rack and operating the wagon-box consist of the shaft $a$, which has a pinion, $c$, and a crank-handle, $g$. The pinion $c$ meshes into a spur-wheel, $d$, on the outer end of a shaft, $b$, and a pinion, $i$, on the inner end of said shaft engages with the rack $h'$ and is held in contact therewith by means of the bar $h''$. Both shafts $a\,b$ are mounted in boxes or bearings on the bed-frame, and the crank-handle $g$ is located on the outside of the latter, so as to be within easy reach of the operator.

It will be manifest that by turning the pinion or spur-wheel shafts the wagon-box is first caused to travel in a horizontal plane, and when the pinion reaches the vertical part of the rack the wagon-box is elevated and caused to assume an inclined position at the rear of the truck or bed-frame, as is shown in Fig. 2. When the wagon-box is in this position the end-gate can be opened more or less, so as to discharge a portion or the entire contents of said box.

Friction-rollers E' at the sides of the wagon-box run upon the longitudinal rails of the truck-frame and serve to guide and steady the movement of said box. The truck-frame is also provided with similar friction rollers, C' D', upon which the wagon-box is free to slide back and forth. These rollers C' D' also serve as stops for arresting the movement of the wagon-box when it is tilted and after its return to a horizontal position upon the truck-frame. They perform the function stated in connection with hooked plates $m'$, $g'$, and $n'$, secured to the under side of the wagon-box. The hooked plates $m'$ and $n'$ are located at the ends of the wagon-box and engage with or slip under said rollers C' D' when the wagon-box is in a horizontal position and rests upon the truck-frame. When the wagon-box is moved to the rear of the bed-frame and tilted thereat, the hooked plate $g'$ will catch under the roller C' and arrest the movement of the wagon-box.

A hook, $k$, fitted on the shaft $b$ of the spur-wheel $d$ and capable of turning thereon, is used as a medium for locking the wagon-box when it rests in a horizontal position upon the truck-frame, and also when it is in a tilted position.

In Fig. 1 the hook $k$ is shown as being entered into an eye or staple on the wagon-box; and in Figs. 2 and 4 a projection or lug, $k'$, formed on the inner side of said hook, is shown when thrown into engagement with the pinion $c$ of the shaft $a$.

It will be obvious that when the hook $k$ is in the position shown in Figs. 2 and 4 the spurred shafts are locked together, so as to hold the wagon-box in an inclined position or prevent its return until the operating devices are again in proper condition for enabling this result to take place.

I do not broadly claim a tilting wagon-box having curved rack-bars arranged to operate in connection with spur-wheels and shafts on a supporting or bed frame; but What I do claim, and desire to secure by Letters Patent, is—

1. In a dumping wagon or cart, the combination of the curved rack-bar $h'$, correspondingly-shaped pinion-retaining bar $h''$, and transverse bar $h$ with the wagon-box A, the operating shaft and pinion $i$, and the bed or truck-frame, as and for the purpose set forth.

2. The hook $k$, having projection $k'$, in combination with the spur-wheels $c$ $d$ and their shafts, and the wagon-box provided with a suitable eye or staple, as and for the purpose set forth.

JOB VON WITZLEBEN.

Witnesses:
C. RICH. SCHLESINGER,
FR. KUNTZE.